United States Patent Office 3,169,045
Patented Feb. 9, 1965

3,169,045
DODECAHYDRODODECABORATE COMPOUNDS
Henry C. Miller, Wilmington, Del., and Earl L. Muetterties, West Chester, Pa., assignors to E. I. du Pont de Nemours and Company, Wilmington, Del., a corporation of Delaware
No Drawing. Filed May 20, 1960, Ser. No. 30,442
10 Claims. (Cl. 23—14)

This invention relates to certain new polyhydropolyborate salts and to methods for making the same.

Compounds of boron and hydrogen whose properties are described in the literature are limited to products having at most 10 boron atoms. The known covalent hydrides include such compounds as $B_2H_6$, $B_5H_9$, $B_5H_{11}$, and $B_{10}H_{14}$. Th known salts of borohydride anions include salts of $BH_4^{-1}$, $B_2H_7^{-1}$, $B_3H_8^{-1}$, $B_{10}H_{13}^{-1}$, and $B_{10}H_{14}^{-2}$. Salts of borohydride anions having more than 10 boron atoms are unknown. Salts of known borohydride anions decompose readily in acid solution and, in fact, the acids of borohydrides were heretofore unknown.

In particular, this invention is directed to a class of polyhydropolyborates characterized by the generic formula (1) $\qquad M_a(B_{12}H_{12})_b$ where M is a cation having a total atomic weight of at least 5 and, further, having a valence of less than 5, ($B_{12}H_{12}$) is an anion having a valence of 2; $a$ and $b$ are each positive whole numbers of 1 through 3 (i.e., greater than 0 and less than 4) whose respective values are determined by the valence of M.

In Formula 1, the term "cation" has reference to an atom or group of atoms with a total atomic weight of at least 5 which, in aqueous solution, forms a positively charged ion. Examples of suitable cations include metals, ammonium ($NH_4^+$), hydrazonium ($NH_2$—$NH_3^+$), N-substituted ammonium, N-substituted hydrazonium, substituted phosphonium, aryldiazonium (aryl-N=N+), and the like.

Metal cations in the compounds of Formula 1 can be derived generally from any metal. The metals according to the Periodic Table in Deming's "General Chemistry," 5th ed., chap. 11, John Wiley & Sons, Inc., and in Lange's "Handbook of Chemistry," 9th ed., pp. 56–57, Handbook Publishers, Inc. (1956), are the elements of Groups I, II, VIII, II-B, IV-B, V-B, VI-B, VII-B and the elements of Groups III-A, IV-A, V-A, and VI-A which have atomic numbers above 5, 14, 33 and 52, respectively. These metals include both light and heavy metals. The light metals are also known as the alkali metals and the alkaline earth metals. The heavy metals include brittle, ductile and low-melting metals as described in the above-mentioned Periodic Table in Lange's "Handbook of Chemistry." Metals having a wide range of atomic weights, e.g., from 6.9 for lithium to 209 for bismuth or even higher, are operable as cations in the compounds of Formula 1.

Preferred metal cations are derived from the elements of Groups I-A, II-A, I-B and II-B having an atomic number up to and including 80, inclusive. These compounds are dodecahydrododecaborates having as cations Li, Na, K, Rb, Cs, Be, Mg, Ca, Sr, Ba, Cu, Ag, Zn, Cd, and Hg.

Most preferred metals for use in the compounds of this invention are the light metals (the alkali and alkaline earth metals of Groups I-A and II-A) having an atomic number less than 87, i.e., lithium, sodium, potassium, rubidium, cesium, beryllium, magnesium, calcium, strontium, and barium.

The lithium, silver, and mercury dodecahydrododecaborates form an especially preferred group of salts.

A further group of particularly useful products are dodecahydrododecaborates in which the cations are derived, directly or indirectly, from nitrogen bases, e.g., $(NH_4)_2B_{12}H_{12}$, $(NH_2$—$NH_3)_2B_{12}H_{12}$, $(RNH_3)_2B_{12}H_{12}$ $(R_2NH_2)_2B_{12}H_{12}$, $(R_3NH)_2B_{12}H_{12}$, $(R_4N)_2B_{12}H_{12}$ $(RNH$—$NH_3)_2B_{12}H_{12}$, $(R_2N$—$NH_3)_2B_{12}H_{12}$ and $(aryl$-$N$=$N)_2B_{12}H_{12}$ In the preceding formulas for compounds derived from nitrogen bases, R represents an organic group bonded to nitrogen. The R groups are not critical features of these cation groups; thus, R can be an open-chained, closed-chained, saturated or unsaturated hydrocarbon or substituted hydrocarbon group, or R can be a heterocyclic ring of which the nitrogen atom is a component part, such as pyridine, quinoline, morpholine, hexamethyleneimine, and the like. Preferably, R, for reasons of availability of reactants, contains not more then 18 carbon atoms. R can be, for example, methyl, 2-ethylhexyl, octadecyl, allyl, cyclohexyl, cyclohexenyl, phenyl, naphthyl, anthryl, cyclohexylphenyl, diphenylyl, benzyl, chloroethyl, ω-cyanoamyl, beta-hydroxyethyl, p-hydroxyphenyl, and the like. The aryl group in the aryldiazonium cation preferably contains at most 18 carbons, e.g., a terphenyldiazonium group.

Examples of N-substituted hydrazonium radicals include those wherein R has the same significance as indicated in the preceding paragraph. To illustrate, the hydrazonium cation can be derived from phenylhydrazine, methyl hydrazine, 1,1-dimethylhydrazine, 1,2-dimethylhydrazine, ethylhydrazine, 1,1-diethylhydrazine, and similar compounds. Examples of aryldiazonium radicals include phenyldiazonium, tolyldiazonium, p-ethoxyphenyldiazonium, and the like.

Thus, the atomic weights of nitrogen bases from which cations are derived can range from a low value of about 17 for ammonia ($NH_3$) to a value as high as about 800 or even higher for long chain substituted nitrogen bases, e.g., trioctadecylamine.

The nitrogen bases can be polybasic, i.e., the bases can form cations having valences of 2, 3, and higher. To illustrate, polybasic nitrogen compounds which can be employed to form salts include diamines (for example, hexamethylenediamine, p-phenylenediamine or piperazine), triamines (for example, diethylenetriamine), tetramines (for example, triethylenetetramine), and the like.

The valence of the cation M will be between 1 and 4, i.e., M can have a valence of 1, 2, 3 or 4. In most cases the valence of M will be 1 or 2 and this group of compounds in which the valence of M is at most 2 are readily preparable and so form a preferred group of compounds in this invention.

The group M can be a combination of cations whose total atomic weight is at least 5. To illustrate, M can be two monovalent metals or a monovalent metal and hydrogen, e.g., (NaK)($B_{12}H_{12}$) or (KH)($B_{12}H_{12}$) or, more simply, $NaKB_{12}H_{12}$ and $KHB_{12}H_{12}$. As a further illustration, M can be a complex cation such as ammino metal groups, e.g., $(NH_3)_nY$, where Y is cobalt, nickel, copper, zinc, cadmium, mercury or silver and $n$ is a positive number of at most 6. Compounds of the invention where M is an ammino metal group, as discussed above, generally have low solubility in water and they are of particular interest because of this property.

The valence of the polyhydropolyborate anion in Formula 1 is 2. The values of $a$ and $b$, therefore, in the generic formula are determined by the valence of M, i.e., $a$ multiplied by the valence of M is equal to $2b$.

The relationship between $a$ and $b$ is further shown by the following equation:

$$b = \frac{a \times \text{valence of M}}{2}$$

The values of $a$ and $b$ are the smallest numbers which satisfy the equation and these values lie between 1 and 3.

Examples of new compounds of the invention, illustrated by formulas, are as follows: $Li_2B_{12}H_{12}$, $Na_2B_{12}H_{12}$, $K_2B_{12}H_{12}$, $BeB_{12}H_{12}$, $MgB_{12}H_{12}$, $CaB_{12}H_{12}$, $SrB_{12}H_{12}$, $BaB_{12}H_{12}$, $V_2(B_{12}H_{12})_3$, $Cr_2(B_{12}H_{12})_3$, $Mn(B_{12}H_{12})$, $Fe_2(B_{12}H_{12})_3$, $Co_2(B_{12}H_{12})_3$, $NiB_{12}H_{12}$, $CoB_{12}H_{12}$, $CuB_{12}H_{12}$, $Ag_2B_{12}H_{12}$, $ZnB_{12}H_{12}$, $CdB_{12}H_{12}$, $HgB_{12}H_{12}$, $Al_2(B_{12}H_{12})_3$, $SnB_{12}H_{12}$, $PbB_{12}H_{12}$, $Bi_2(B_{12}H_{12})_3$, $(NH_4)_2B_{12}H_{12}$, $[(CH_3)_4N]_2B_{12}H_{12}$, $[(CH_3)_3NH]_2B_{12}H_{12}$, $(C_2H_5NH_3)_2B_{12}H_{12}$, $(C_8H_{17}NH_3)_2B_{12}H_{12}$, $[(C_{18}H_{37})_2NH_2]_2B_{12}H_{12}$, $(\text{pyridinium})_2B_{12}H_{12}$, $[(C_6H_{11})_2NH_2]B_{12}H_{12}$, $(NH_2\text{---}NH_3)_2B_{12}H_{12}$, $[(CH_3)_2N\text{---}NH_3]_2B_{12}H_{12}$, $[(C_6H_5)_2N\text{---}NH_3]_2B_{12}H_{12}$, $[Cu(NH_3)_4]B_{12}H_{12}$, $[Zn(NH_3)_4]B_{12}H_{12}$, $[Co(NH_3)_4]B_{12}H_{12}$, $[Cd(NH_3)_4]B_{12}H_{12}$, $(\text{morpholinium})_2B_{12}H_{12}$ and $(C_6H_5N_2)_2B_{12}H_{12}$.

In general, the new compounds are usually solid products which are salt-like in character. Many of the compounds dissolve in water or hydroxylated solvents. The majority of the compounds are white crystalline materials which are generally stable at normal atmospheric temperatures and pressures. The compounds, as obtained, frequently contain water or solvent of crystallization. Compounds in this form are included within the scope of the invention. Solvents of crystallization are readily removed, as described later, by conventional procedures, e.g., recrystallization, heating under reduced pressure, and the like.

The tendency of the salts to crystallize with solvent of crystallization or water of hydration makes it difficult at times to identify accurately the composition of the polyhydropolyborate anion solely on the basis of elementary analyses. However, identity of the compounds can be confirmed by strong characteristic absorption bands of the $B_{12}H_{12}$ anion in the infrared absorption spectrum which appear at $4.0\mu \pm 0.1$ and $9.35\mu \pm 0.1$. These bands for the heretofore unknown $B_{12}H_{12}$ anion appear consistently in hydrate-free salts, hydrated salts, and salts having other solvents of crystallization.

In the infrared absorption spectra of some of the dodecahydrodecaborates, the absorption at $4.0\mu$ appears as a doublet in which there is a shoulder on the $4.0\mu$ band at about $4.11\mu$.

It is noted that no official system of naming of boron compounds has been adopted at the present time. The nomenclature used herein follows the proposals made by a group of the Committee on Nomenclature of the American Chemical Society Division of Organic Chemistry. These proposals are discussed in (1) a paper presented by G. W. Schaeffer at the American Chemical Society Meeting, San Francisco, California, April 13–18 (1958), (2) a paper presented by K. L. Loening to the Division of Chemical Literature, American Chemical Society Meeting, Chicago, Illinois, September 7–12 (1958), and (3) a publication by Patterson, Chemical Engineering News 34, 560 (1956). The compounds of the present invention will be referred to as dodecahydrododecaborates (2−), employing the appropriate conventional name for the cation, e.g., disodium dodecahydrododecaborate (2−). For simplicity, the anion valence, (2−), will be omitted, but it is understood that this designation is implied in the name.

The compounds of Formula 1 above can be made by processes which involve the reaction of an alkali metal or alkaline earth metal hydroborate and diborane to produce alkali metal or alkaline earth metal dodecahydrododecaborates. These compounds can be represented by the formula:

(2)  $M'_a(B_{12}H_{12})$ where M' is an alkali metal or alkaline earth metal and $a$ has a value of 1 or 2. As will be disclosed below, these products are then further reacted with an appropriate salt or base to combine the desired cations with the dodecahydrododecaborate anion.

The reactants used in these processes of preparing the compounds of this invention are commercially available. Any alkali metal or alkaline earth metal hydroborate can be used, but sodium and potassium hydroborates are the most readily available salts and they, therefore, form a preferred group.

The alkali metal and alkaline earth metal hydroborates employed are also referred to as metal borohydrides and they can be represented by the general formula:

(3)  $M'(BH_4)_x$ where M' is selected from the group consisting of alkali metals and alkaline earth metals, and $x$ is a positive whole number 1 or 2, i.e., $x$ represents the valence of M'.

Alkali metal and alkaline earth metals are, of course, elements of atomic numbers 3–56, inclusive, of Groups I-A and II-A of the Periodic Table. M' can be, for example, lithium, sodium, potassium, rubidium, cesium, beryllium, magnesium, calcium, strontium, and barium. When M' is an alkali metal, $x$ has a value of 1; and when M' is an alkaline earth metal, $x$ has a value of 2.

Diborane, the second reactant in these processes, is represented by the formula, $B_2H_6$.

In general, commercial grade materials are satisfactory for use in these processes without special purification. It is, of course, preferable that the reactants be free of adventitious moisture which, if present, may lower the yield of desired product.

The reaction is conducted by maintaining the reactants in contact under superatmospheric pressure in the substantial absence of moisture and at the desired temperature until an appreciable amount of polyhydropolyborate has been formed. As a matter of convenience, the reaction is frequently conducted under autogenous pressure in a suitable pressure vessel. In this mode of operation, a pressure vessel is employed which is lined with a corrosion-resistant material, e.g., commercially available stainless steels, platinum or silver. The pressure vessel is preferably flushed with an inert gas to remove adventitious moisture and it is then charged with an alkali metal hydroborate and, optionally, with a solvent. The vessel is closed and cooled to a low temperature with, e.g., liquid nitrogen, solutions of solid carbon dioxide, and the like. The vessel is connected to a vacuum pump and the internal pressure is reduced to a value sufficiently low, e.g., 1 mm. or less (as low as 0.001 mm.), to permit the desired quantity of diborane to be pressured into the reaction vessel. The reaction mixture is held at 0° C. or higher for the period necessary to effect reaction. The mixture is preferably agitated by any suitable means during the heating period.

The molar ratio in which the reactants are used is not critical. It is preferable to use at least as much diborane as alkali metal hydroborate, i.e., the molar ratio of $B_2H_6/M'(BH_4)_x$ is preferably at least 1. To obtain high yields of polyhydropolyborates having 12 boron atoms and an equal number of hydrogen atoms, it is desirable to use diborane in considerable excess, i.e., the molar ratio, $B_2H_6/M'(BH_4)_x$ is preferably 2 or 3 or even higher. It is not necessary, however, to use these ratios to obtain at least some quantity of the desired polyhydropolyborates.

At 100° C., or higher, the principal product is a polyhydropolyborate having at least 12 boron atoms and, generally, although not necessarily, an equal number of hydrogen atoms. A principal product at the higher temperatures of operation is a dodecahydrododecaborate salt of Formula 2.

Heating of the reactants may be accomplished by any suitable means. The temperature may be raised by a stepwise procedure or the desired temperature may be reached by a one-step process.

It is essential that the reaction be conducted at a pressure higher than atmospheric. Accurate control of the pressure is not necessary and autogenous pressure obtained in the reaction chamber is normally used. This pressure may lie between about 3 to 500 atmospheres (absolute) or even higher. It is preferable that the reaction be conducted at a pressure of 5 atmospheres (absolute) or higher.

Mixing of the reactants during the process is desirable although not essential. Mixing can be accomplished by any suitable means, e.g., by mechanical stirring, shaking or tumbling of the entire reactor.

The time of the reactants during the process is desirable although not essential. Mixing can be accomplished by any suitable means, e.g., by mechanical stirring, shaking or tumbling of the entire reactor.

The time of the reaction is not critical. In a batch process, the time will generally lie between about 1 hour and 50 hours. In general, a reaction time of 5 hours to 25 hours is sufficient for batch operation. For a continuous process, which can also be employed, shorter reaction times are used and unreacted components can be recirculated.

In working up the reaction products, the volatile reaction products are generally removed by venting the vessel to the atmosphere. Hydrogen is a by-product of the reaction and it is removed with the volatile products. Suitable precautions should be observed in venting the reaction vessel in view of the flammability, toxic or, possibly, explosive hazards of the volatile products.

The reaction products, left after venting, are generally liquids or solids. They can be separated and purified by conventional procedures, e.g., filtration, crystallization, solution chromatography, and the like. The products should be handled with the customary precautions observed in handling chemical compounds to prevent undue contact with the skin or inhalation of fine powders.

In a preferred form of these processes, the reaction between diborane and the alkali metal or alkaline earth metal hydroborate is conducted in the presence of an inert solvent, i.e., a liquid which is unreactive under the conditions of the reaction with the components of the process and with the products which are derived. Ethers, thioethers (i.e., sulfides), tertiary amines, trisubstituted phosphines and hydrocarbons can be used in the process. The solvents preferably are liquids at the operating temperature and, in most cases, are liquids at prevailing atmospheric temperatures. Examples of operable solvents are diethyl ether, 1,2-dimethoxyethane (glyme), 1,2-diethoxyethane, benzene, hexane, triethylamine, tributylamine, dimethyl sulfide, dibutyl sulfide, triethylphosphine, tributylphosphine, and the like. Ethers and tertiary amines are preferred solvents. Relatively high boiling ethers or amines, such as glyme or triethylamine, are especially preferred.

The alkali metal and alkaline earth metal dodecahydrododecaborates can be employed to prepare compounds of Formula 1. For example, an aqueous solution of an alkali metal or alkaline earth metal salt is contacted with a strong acid or with a strongly acidic cation exchange resin to obtain the free acid, $H_2B_{12}H_{12}$. The acid, generally in solution, is reacted with oxides of metals, hydroxides of metals, salts of metals (both organic and inorganic), nitrogen bases, salts of nitrogen bases (both organic and inorganic), and similar types of compounds to obtain dodecahydrododecaborates which have the desired cation M. In a process employing an ion exchange resin, strongly acidic resins of the sulfonic acid variety are preferred because of availability, e.g., "Amberlite" IR–120–H and "Dowex" 50. To illustrate, an aqueous solution of $Na_2B_{12}H_{12}$ is passed through a column packed with "Amberlite" IR–120–H. The eluent, which contains the acid $H_2B_{12}H_{12}$, is evaporated under reduced pressure to obtain the concentrated acid, generally as a hydrate, in the form of a white crystalline solid. The acid, in aqueous solution, can be reacted with nitrates, chlorides, bromides, acetates, benzoates and similar salts of metals or other bases to obtain salts of Formula 1.

In a second mode of operation the alkali metal and alkaline earth metal dodecahydrododecaborates can undergo simple metathetic reactions with other salts to effect an exchange of cations. Thus, $Na_2B_{12}H_{12}$ can be reacted with ammonium sulfate, pyridinium chloride, morpholinium sulfate, silver nitrate and ferric sulfate in aqueous or non-aqueous solution (e.g., methanol) to form dodecahydrododecaborates having as cations ammonium, pyridinium, morpholinium, silver and iron. These illustrations are not limiting and they demonstrate the breadth of metathetic reactions which can be used.

The novel products obtained by the processes of this invention are useful as sequestering agents for metals, especially heavy metals.

To illustrate, a mixture of hydrocarbons in the boiling range of gasoline, which contains in solution a copper salt of an organic acid (copper stearate), is thoroughly agitated with an aqueous ammoniacal solution of $Na_2B_{12}H_{12}$. The hydrocarbon layer, which is separated from the aqueous reagent, is completely free of the deleterious copper salt.

The new compounds are useful as sequestering agents for metals in aqueous media. Thus, copper, nickel, cobalt, zinc and cadmium are removed from aqueous solutions of salts containing these metals by mixing the solutions with an ammoniacal solution of an alkali metal or alkaline earth metal salt of a dodecahydrododecaborate, e.g., $Na_2B_{12}H_{12}$, $K_2B_{12}H_{12}$, $Cs_2B_{12}H_{12}$ and $CaB_{12}H_{12}$.

The ammonium, tetramethylammonium and, in general, nitrogen-base salts are also useful in the field of sequestering agents to remove undesirable metals from aqueous or hydrocarbon media. In addition to the metals named in the preceding paragraphs, silver ions are removed from solutions containing them by treatment with $Na_2B_{12}H_{12}$. Mercury anions are removed by treatment with ammoniacal solutions of dodecahydrododecaborates.

The diazonium salts, when heated or struck, decompose with rapid energy release and they are useful in compositions employed as explosion initiators.

In the especially preferred group of salts, lithium dodecahydrododecaborate is useful for modifying the combustion characteristics of hydrocarbon fuels; silver dodecahydrododecaborate is useful in the field of light-sensitive chemicals employed in photography; and mercury dodecahydrododecaborate is useful in biochemical applications for which mercury compounds are frequently employed.

The invention is further illustrated by reference to the following examples. In each of the examples the product which is isolated and characterized is a dodecahydrododecaborate. However, other polyhydropolyborates can also be obtained. These compounds have the following general formula:

(4) $\qquad M'_{a'}(B_nH_m)_{b'}$ wherein M' is selected from the group consisting of alkali metals and alkaline earth metals, $(B_nH_m)$ is an anion having a valence of 1–3, inclusive, $a'$ and $b'$ are positive whole numbers of 1 through 3 whose values are determined by the valences of M' and $(B_nH_m)$, $n$ is an integer of at least 3, $m$ is an integer greater than 3 and is at least equal to $n$, and the sum of $m$, $n$, and the valence of $(B_nH_m)$ is a positive even number.

The valence of M' can be 1 or 2, and the value of $n$ can range up to 14, 20, or even more. The relationship between $a'$ and $b'$ is more particularly expressed by the equation (5) $\qquad b' = \dfrac{a' \times \text{valence of M'}}{\text{valance of } B_nH_m}$ Note that the value of $m$ is at least 4 and that it can be equal to or greater than $n$ but never less than $n$.

The composition of the hydroborates obtained in the process can be controlled by conditions under which the reaction is conducted so as to fix the atomic ratio of boron to hydrogen.

Example I

A pressure vessel (capacity, 80 ml.), is charged with 1.9 g. of sodium hydroborate, 2.8 g. of diborane and 10 ml. of glyme. The mixture is heated with agitation under autogenous pressure at 100° C. for 10 hours. The reaction vessel is cooled and it is vented to remove volatile products. It is noted that these products contain about 0.187 mole of free hydrogen and no diborane. The residue in the reaction vessel consists of a white solid suspended in a yellow liquid. The solid is separated by filtration and washed with glyme. After drying, the solid weighs 3.2 g. and it is found by elemental analysis to be a mixture which, solely on the basis of elemental analysis, can have the following compositions:

*Analysis.*—Calc'd for $Na_2B_{12}H_{12} \cdot 1.16 C_4H_{10}O_2 \cdot 0.36 NaBH_4 \cdot H_2O$:

C, 17.20; H, 8.40; B, 41.27; Na, 16.74. Found: C, 17.07; H, 8.36; B, 40.66; Na, 16.5.

The compound shows the characteristic infrared absorption spectra of the $B_{12}H_{12}$ anion, i.e., bands at $4.0\mu \pm 0.1$ and $9.35\mu \pm 0.1$ and it is, therefore, evident that the product on the basis of the infrared absorption spectrum and elemental analysis is disodium dodecahydrododecaborate (2−).

Example II

Using the procedure described in Example I, a mixture of 1.9 g. of sodium hydroborate, 10 ml. of dry ethyl ether and 2.7 g. of diborane is heated for 10 hours at 100° C. under autogenous pressure. The volatile products obtained in the reaction contain 0.2 mole of hydrogen and no diborane. A solid product in the reaction vessel is collected, washed thoroughly with dry ether and dried to give 2.68 g. of a white solid. The infrared absorption spectrum of the solid shows that it is a mixture of sodium hydroborate and a disodium polyhydropolyborate (2−). Crystallization of the crude product from a mixture of tetrahydrofuran and glyme yields a disodium polyhydropolyborate (2−) containing 1 mole of glyme and 1 mole of water of crystallization. The compound has the formula $Na_2B_{12}H_{12} \cdot C_4H_{10}O_2 \cdot H_2O$, as shown by the characteristic absorption bands in the infrared absorption spectrum.

Example III

Using the procedure described in Example I, a mixture of 1.9 g. of sodium hydroborate, 2.8 g. of diborane and 10 ml. of dry triethylamine is heated for 10 hours at 120° C. under autogenous pressure. The volatile reaction products contain 0.18 mole of hydrogen. The nonvolatile product in the reactor is diluted with ethyl ether and a quantity (2.64 g.) of insoluble material is separated by filtration. The solid is extracted with hot tetrahydrofuran, leaving 0.74 g. of unchanged sodium hydroborate. Glyme is added to the tetrahydrofuran filtrate to form a precipitate which, when separated and purified in the usual manner, yields 2.0 g. of a disodium polyhydropolyborate which is $Na_2B_{12}H_{12}$.

Example IV

A mixture of 1.9 g. of sodium hydroborate and 2.8 g. of diborane is heated, as described in Example I, for 10 hours at 120° C. under autogenous pressure. A small amount of diborane and 0.145 mole of hydrogen is recovered in the volatile reaction products. A solid which forms in the reaction vessel is removed, washed with ether and dried to give 2.85 g. of material. The solid is extracted with hot tetrahydrofuran, leaving 1.4 g. of sodium hydroborate. The tetrahydrofuran extract is evaporated, leaving 0.21 g. of a disodium polyhydropolyborate, i.e., disodium dodecahydrododecaborate (2−).

Example V

A. A pressure vessel of 400 ml. capacity is charged with 9.5 g. of sodium hydroborate and 75 ml. of glyme. The vessel is closed, cooled to −80° C. and evacuated to a pressure of about 0.001 mm. of mercury. Diborane (14.0 g.) is charged into the vessel which is then sealed and heated with agitation under autogenous pressure for 10 hours at 120° C. The molar ratio of $NaBH_4$ to $B_2H_6$ in this reaction is 1:2. The reactor is cooled, the volatile products are released by venting and the contents of the tube are washed into a receiver with glyme. A suspension of a white solid in a yellow liquid is formed from which the solid is separated by filtration. The solid is dissolved in hot tetrahydrofuran and the solution is filtered to remove a trace of unreacted sodium hydroborate. The hot filtrate is diluted with glyme and chilled to yield 14.0 g. of disodium polyhydropolyborate (2−) as long, glistening white needles. The compound crystallizes with 1,2-dimethoxyethane and water of solvation. The compound has the following infrared absorption frequencies: $2.8\mu$, sharp, medium; $3.9\mu$ with $4.02\mu$ shoulder, sharp, strong; 6.2, 7.8 and $8.4\mu$, sharp, medium; $9.3\mu$, medium sharp, strong; $10.9\mu$, sharp, strong; and $13.9\mu$, broad, weak. It has the following elemental analysis:

*Analysis.*—Found: C, 15.52; H, 8.43; B, 47.12; Na, 15.3. The compound, therefore, has the following composition: $Na_2B_{12}H_{12} \cdot 0.89 C_4H_{10}O_2 \cdot 0.56 H_2O$ (calc'd anal.: C, 15.37; H, 7.98; B, 46.67; Na, 16.49).

The compound can be obtained as its hydrate, free of ether of solvation, by recrystallization from a large quantity of diethyl ether or tetrahydrofuran/diethyl ether mixtures. The ether-free hydrate has the formula $$Na_2B_{12}H_{12} \cdot H_2O$$

and its infrared absorption characteristics are as follows: $2.8\mu$, sharp, medium; $3.9\mu$, sharp, strong; $6.2\mu$, sharp, medium; $9.25\mu$, sharp, medium; and $13.9\mu$, broad, medium.

*Analysis.*—Calc'd for $Na_2B_{12}H_{12} \cdot H_2O$: H, 6.85; B, 63.05; Na, 22.32. Found: H, 6.56; B, 62.02; Na, 20.5.

B. The procedure of Part A is repeated, employing 9.5 g. of sodium hydroborate and 26.0 g. of diborane. The molar ratio of $NaBH_4$ to $B_2H_6$ is about 1:4. There is obtained 10 g. of a disodium polyhydropolyborate which is shown to be disodium dodecahydrododecaborate (2−) and 60 g. of another disodium polyhydropolyborate (2−). The latter compound yields 30 g. of highly purified product on recrystallization.

Example VI

Using the procedure of Example I, a mixture of 1.9 g. of sodium hydroborate, 2.8 g. of diborane and 15 ml. of benzene is heated for 10 hours at 120° C. under autogenous pressure. The volatile reaction product contains 0.19 mole of hydrogen and no diborane. The vessel contains a yellow solid suspended in a clear liquid. The solid is removed by filtration and washed with glyme. The infrared absorption spectrum of the solid shows that it is principally a disodium polyhydropolyborate (2−) with some unchanged sodium hydroborate, i.e., disodium dodecahydrododecaborate (2−) with a minor quantity of sodium hydroborate.

Example VII

Using the procedure of Example I, a mixture of 2.8 g. of potassium hydroborate, 2.8 g. of diborane and 15 ml. of glyme is heated for 10 hours at 120° C. under autogenous pressure. A total of 0.281 mole of hydrogen is formed. The yellow solid in the reaction vessel is collected on a filter and it is washed with glyme until it is colorless. The solid is dried under very low pressure (less than 1 mm. of mercury) at 90° C. to yield 3.93 g. of dipotassium polyhydropolyborate (2−), i.e., dipotassium dodecahydrododecaborate ($K_2B_{12}H_{12}$).

One-half of the above solid product is dissolved in water and aqueous tetramethylammonium chloride is added to the solution. A white solid separates which dissolves incompletely when the solution is heated to boiling. The solution is filtered and the filtrate is chilled to precipitate bis (tetramethylammonium) dodecahydrododecaborate (2−). There is obtained 0.38 g. of the product which has the formula $[(CH_3)_4N]_2B_{12}H_{12}$.

*Example VIII*

A pressure vessel (capacity, 80 ml.) is charged with 0.76 g. of sodium hydroborate and 15 ml. of tri-(n-butyl)-phosphine. The vessel is closed and cooled to about −80° C. by immersion in a solid carbon dioxide-acetone bath. Pressure in the vessel is reduced to a very low value (0.1 mm. or less) by means of a vacuum pump. Diborane (3.1 g.) is injected into the vessel which is then closed. The reaction mixture is heated with agitation under autogenous pressure for 10 hours at 120° C. The reaction vessel is cooled and volatile gases are removed by venting. The gases contain 0.19 moles of hydrogen. A white solid suspended in a yellow liquid remains in the reaction vessel. The mixture is filtered to separate the white solid which is washed with glyme and dried at low pressure (0.001 mm. or less) at 90–100° C. There is obtained 1.61 g. of $Na_2B_{12}H_{12}$, containing glyme of solvation. The identity of the product is confirmed by the infrared absorption spectrum.

*Example IX*

A pressure vessel (capacity, 400 ml.) is charged with 19.0 g. sodium hydroborate and 75 ml. of dry triethylamine. The vessel is cooled in a solid carbon dioxide-acetone bath and the internal pressure is reduced to less than 1.0 mm. pressure by means of a vacuum pump. Diborane (36.0 g.) is introduced into the vessel which is then closed. The mixture is heated with agitation for 10 hours at 180° C. After cooling the vessel and venting to remove volatile products, there remains a solid residue which is washed from the vessel with glyme. The solid is separated by filtration and it is again washed with glyme. The washed solid is dissolved in hot tetrahydrofuran and the solution is filtered to remove a small quantity of insoluble product. The filtrate is heated to boiling and glyme is added slowly until solid material begins to separate. The mixture is chilled and it is then filtered to separate the white crystals. These crystals are washed with glyme and dried at less than 0.001 mm. pressure at 90–100° C. to yield 43.9 g. of $Na_2B_{12}H_{12}$ containing glyme and water of solvation. Further treatment of the filtrate yields an additional 5.4 g. of the product.

*Example X*

A pressure vessel (80 ml. capacity) is charged as described in Example VIII with 0.76 g. sodium hydroborate, 15 ml. of dimethyl sulfide and 3.3 g. of diborane. The mixture is heated at 120° C. for 10 hours with agitation and the volatile products are removed as described in Example VIII. The volatile products contain 0.123 mole of hydrogen. Dimethyl sulfide is removed from the residue in the reaction vessel by distillation and there remains a white solid which is recrystallized from a tetrahydrofuran/glyme mixture. After drying, the product, which is $Na_2B_{12}H_{12}$ containing glyme and water of solvation, weighs 1.57 g.

In the operation of the process at 100° C. or higher precursors of the alkali metal hydroborate can be employed, e.g., an alkali metal and diborane, in place of the alkali metal hydroborate. This mode of operation is illustrated in Example XI.

*Example XI*

Using the procedure of Example I, a mixture of 1.07 g. of metallic sodium, 2.5 g. of diborane and 10 ml. of glyme is heated under autogenous pressure for 10 hours at 100° C. The volatile products obtained on venting the reactor contain 0.12 mole of hydrogen. The reaction vessel contains 1.72 g. of white solid and approximately 0.9 g. of unreacted sodium metal. A portion (0.5 g.) of the white solid, which is shown by infrared spectrographic analysis to contain disodium polyhydropolyborate (2−) is dissolved in water and the solution is treated with excess aqueous tetramethylammonium chloride. There is obtained 0.2 g. of bis(tetramethylammonium) polyhydropolyborate (2−). The compound has the formula $[(CH_4)_3N]_2B_{12}H_{12}$.

Other precursors for alkali metal hydroborates which may be employed are alkali metal hydrides and diborane or a combination of an alkali metal, hydrogen and diborane.

In Examples I through XI the principal product which is isolated and characterized is a salt of dodecahydrododecaborate. However, as stated previously, the process yields a broad range of polyhydropolyborates represented generically by Formula 4. The preparation and isolation of a representative polyhydropolyborate, falling within the broad scope of compounds of Formula 4, i.e., sodium octahydrotriborate, is illustrated in Example XII.

*Example XII*

(A) A pressure vessel (capacity 80 ml.) is charged with 1.9 g. (0.05 mole) of sodium hydroborate ($NaBH_4$) and 10 ml. of dry 1,2-dimethoxyethane (glyme). The vessel is closed and it is cooled to −80° C. Pressure in the vessel is then reduced to less than 1 mm. of mercury and 2.0 g. (0.073 mole) of diborane ($B_2H_6$) is charged into the vessel. The vessel is sealed and the reaction mixture is heated with agitation for 10 hours at 60° C. under autogenous pressure.

The vessel is cooled and it is vented to remove volatile material. An amber liquid remains which is held under reduced pressure (less than 1 micron) at the prevailing atmospheric temperature (about 25° C.) until all volatile material is removed. There remains 9.2 g. of oily product which is sodium octahydrotriborate containing glyme.

(B) The process of Part A is repeated employing 1.9 g. (0.05 mole) of sodium hydroborate, 1.8 g. (0.06 mole) of diborane and 10 ml of glyme. The mixture is held at 25° C. under autogenous pressure (about 18 atmospheres' gauge) for 10 hours. The volatile products contain 0.04 mole of unreacted diborane and 0.05 mole of hydrogen. The residue is a clear liquid which, following evaporation of the solvent, leaves 6.4 g. of sodium octahydrotriborate containing glyme.

(C) A water solution containing 5 g. of tetramethylammonium chloride is added to an aqueous solution of the sodium octahydrotriborate obtained in Part A. A white solid separates which redissolves upon heating the mixture to reflux. The hot solution is mixed with an equal volume of methanol and it is then chilled in an ice bath. Tetramethylammonium octahydrotriborate (1−) separates as white crystals. A total of 4.97 g. of product is obtained from several crystallizations. The identity of the compound, which has the formula $$(CH_3)_4NB_3H_8$$

is confirmed by the infrared absorption spectrum which is in agreement with data reported for octahydrotriborate (1−) salts.

The oily product obtained initially in the reaction is converted to other metal salts by reaction with the appropriate chloride. To illustrate, a methanol solution containing 0.83 g. of the oily product is mixed with an equal weight of cesium chloride. The mixture is heated to reflux and just enough water is added to form a clear solution. The hot mixture is chilled in an ice bath and dense crystals form which are separated by filtration. The crystals are washed and dried and there is obtained 0.35 g. of cesium octahydrotriborate (1−), i.e., $CsB_3H_8$.

*Analysis.*—Calc'd for $CsB_3H_8$: Cs, 76.6; B, 18.75; H, 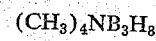

4.65. Found: Cs, 71.55; B, 19.05; H, 4.67.

In each of the foregoing examples, the reaction is conducted under superatmospheric pressure. Reaction of sodium hydroborate and diborane at atmospheric pressure does not yield the desired polyhydropolyborates. To illustrate, a vessel is charged with 0.95 g. of sodium hydroborate and 15 ml. of dry glyme. The charged vessel is evacuated to about 50 mm. pressure and sufficient diborane (0.8 g.) is added to bring the pressure in the vessel to 1 atmosphere (15 lb./sq. in. absolute) at the prevailing temperature, i.e., about 25° C. The vessel is closed, placed on a mechanical shaker and agitated at 25° C. for about 4.0 hours. The internal pressure remains unchanged at 1 atmosphere. All of the diborane is recovered unchanged and no hydrogen attributable to the reaction of diborane with sodium hydroborate is found. The process is repeated, charging sufficient diborane (2.3 g.) into the vessel until a pressure of 3 atmospheres (absolute) is reached. After shaking the mixture for 4 hours at 25° C., an increase in pressure is observed on the gauge. Hydrogen is found in the volatile reaction products and only 2.1 g of diborane is recovered. Sodium octahydrotriborate (1.0 g.) is isolated from the solid reaction product.

From the foregoing data, it is evident that an essential feature of the process is the use of a pressure of at least about 3 atmospheres, i.e., 45 lb./sq. in. absolute, in the process to obtain totally unexpected results. At higher pressures, e.g., 5 atmospheres or higher, the reaction proceeds rapidly and good yields of desired products are obtained.

Pressures above atmospheric can be obtained by any suitable means. Inert gases, e.g., nitrogen, argon, helium, saturated hydrocarbons, and the like, can be charged into the reaction vessel with diborane to provide the pressure under the reaction conditions. Diborane can be used in excess, as illustrated in the examples, to provide a convenient way of obtaining superatmospheric pressure.

It is not essential that a solvent be employed in the process. However, in the event a solvent is employed care should be exercised in the choice. To illustrate, glyme in the presence of sodium hydroborate and diborane is unreactive, and it is a preferred solvent. However, glyme and diborane in the absence of sodium hydroborate react at 100° C. with cleavage of the glyme. Similarly, at low temperatures, i.e., at less than about 80° C., diethyl ether is a satisfactory solvent but at higher temperatures, generally above 100° C., it shows some cleavage. It is preferable, therefore, to employ the higher boiling solvents at temperatures above 100° C.

Examples I–XI illustrate principally the preparation of alkali metal dodecahydrododecaborates. The free acid, $H_2B_{12}H_{12}$, can be prepared from a salt of this type as illustrated in Example XIII–A below. The acid is then reacted with an appropriate salt or base, as illustrated in Example XIII–B, to obtain a broad range of salts having the dodecahydrododecaborate anion.

Example XIII (A) An aqueous solution containing 0.43 g. of disodium dodecahydrododecaborate (2−), obtained by the process described in Example II, is passed through a 0.5″ diameter chromatography column containing 80 ml. of the ion exchange resin known commercially as "Amberlite" IR–120–H, acid form. The strongly acid effluent from the column is evaporated to remove all materials volatile at less than 0.001 mm. at 45° C. There remains 0.38 g. of a very white, crystalline, very hygroscopic solid which is dihydrogen dodecahydrododecaborate (2−). The acid has a $pK_a$ value at 25° C. of about 2.0 and it titrates as a very strong acid, having an equivalence point at a pH of 7. The infrared absorption spectrum of the acid, which has the formula $H_2B_{12}H_{12}$, shows strong absorption at $3.98\mu$ and $9.3\mu$.

(B) An aqueous solution of the free acid $(H_2B_{12}H_{12})$ obtained from $Na_2B_{12}H_{12}$ is neutralized by treatment with cesium hydroxide. A white solid precipitates which is separated by filtration and dried as described above. The product, which is $Cs_2B_{12}H_{12}$, dicesium dodecahydrododecaborate (2−) is sparingly soluble in water and it is characterized by the following infrared absorption bands: $3.9\mu$, $9.35\mu$, sharp, strong; $14.0\mu$, sharp, medium; $13.3\mu$, medium broad, weak.

*Analysis.*—Calc'd for $Cs_2B_{12}H_{12}$: Cs, 65.18; B, 31.84; H, 2.97. Found: Cs, 62.7; B, 30.91, 31.08; H, 3.17.

(C) An aqueous solution of the acid, $H_2B_{12}H_{12}$, is neutralized with an aqueous solution of barium hydroxide. The clear neutralized solution is evaporated to dryness under reduced pressure to obtain barium dodecahydrododecaborate as a white crystalline residue. The product which has the formula $BaB_{12}H_{12}$ [barium dodecahydrododecaborate (2−)], is very soluble in water and ethyl alcohol. The infrared absorption spectrum of the compound shows bands at $4.03\mu$ and $9.34\mu$ which are within the range of characterizing absorption bands for the $B_{12}H_{12}$ anion.

*Analysis.*—Calc'd for $BaB_{12}H_{12}\cdot\frac{1}{3}C_2H_5OH\cdot 1\frac{2}{3}H_2O$: Ba, 42.30; B, 39.99; H, 5.37; C, 2.46. Found: Ba, 42.16; B, 39.61; H, 5.41; C, 2.37.

An aqueous solution of the acid, upon treatment with tetramethylammonium chloride or tetramethylammonium hydroxide yields $[(CH_3)_4N]_2B_{12}H_{12}$. In like manner, reaction of the acid with aqueous hydrazine yields $(NH_2NH_3)_2B_{12}H_{12}$; with phenylhydrazine, $$(C_6H_5NHNH_3)_2B_{12}H_{12}$$

with morpholine,

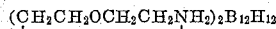

with ferrous sulfate, $FeB_{12}H_{12}$, with calcium hydroxide, $CaB_{12}H_{12}$; with cobalt chloride, $Co(B_{12}H_{12})$; with mercuric nitrate, $HgB_{12}H_{12}$; with bismuth chloride, $$Bi_2(B_{12}H_{12})_3$$

with magnesium chloride, $MgB_{12}H_{12}$; with pyridine, $(C_5H_5NH)_2B_{12}H_{12}$; with ammonia, $(NH_4)_2B_{12}H_{12}$; with ethylamine, $(C_2H_5NH_3)_2B_{12}H_{12}$; with trioctylamine, $$[(C_8H_{17})_3NH]_2B_{12}H_{12}$$

with ω-aminocapronitrile, $[CN(CH_2)_5NH_3]_2B_{12}H_{12}$; with cyclohexylamine, $(C_6H_{11}NH_3)_2B_{12}H_{12}$; with diphenylamine, $[(C_6H_5)_2NH_2]_2B_{12}H_{12}$; and with p-aminobenzoic acid, $(HOOCC_6H_4NH_3)_2B_{12}H_{12}$.

A broad range of salts can be obtained by employing metathetic reactions between alkali metal or alkaline earth metal dodecahydrododecaborates and other salts, as illustrated in Example XIV.

Example XIV (A) An aqueous solution containing 0.3 g. of disodium dodecahydrododecaborate, obtained by a process as described in Example II, is mixed with an aqueous solution containing an equal weight of tetramethylammonium chloride. A white precipitate forms immediately. The mixture is heated to boiling and sufficient methanol is added to form a clear solution. The solution is chilled and white crystals form which are separated by filtration, washed and dried at very low pressure at 90° C. There is obtained 0.14 g. of bis(tetramethylammonium)dodecahydrododecaborate (2−).

*Analysis.*—Calc'd for $[(CH_3)_4N]_2B_{12}H_{12}$: C, 33.11; H, 12.5; B, 44.74; N, 9.65. Found: C, 30.80; H, 11.77; B, 46.61; N, 9.16, 8.88.

The infrared absorption spectrum of the compound is as follows, using a "Nujol" mull: $3.95\mu$, sharp, strong; fine structure at $4.9$–$6.5\mu$, weak; $7.8\mu$, sharp, medium; $9.4\mu$, sharp, strong; and [for the $(CH_3)_4N^+$ cation], $10.5\mu$, sharp, strong.

The compound can be purified by recrystallization from water to yield the monohydrate.

*Analysis.*—Calc'd for [(CH₃)₄N]₂B₁₂H₁₂·H₂O: C, 31.13; H, 12.41; B, 42.07; N, 9.08. Found: C, 30.95; H, 11.48; B, 42.68; N, 8.80, 8.91.

(B) An aqueous solution containing 0.25 g. of disodium dodecahydrododecaborate (2−), obtained by a process as described in Example II, is treated with an aqueous solution containing 0.25 g. of cesium chloride. A white precipitate forms which redissolves when the mixture is heated to boiling. Upon chilling, dense white crystals are precipitated which are a mixture of dicesium dodecahydrododecaborate (2−) and cesium chloride. The crystals are separated and dried at 90° C. under reduced pressure (less than 1 mm. of mercury), to obtain 0.31 g. of white crystals. The product can be further purified by recrystallization from water and it has the composition:

$$Cs_2B_{12}H_{12} \cdot CsCl \cdot H_2O$$

*Analysis.*—Calc'd for Cs₃B₁₂H₁₄ClO: Cs, 67.11; H, 2.37; B, 21.85; Cl, 5.96. Found: Cs, 66.2; H, 2.21; B, 22.14; Cl, 6.33.

The infrared absorption spectrum of a "Nujol" mull of the compound shows the following absorption bands: 3.9μ, 4.1μ, doublet, sharp, strong; 9.25μ, sharp, strong; 9.45μ, sharp, medium; 13.75μ, sharp, medium; 14.05μ, sharp, medium.

*Example XV*

An aqueous solution of 3.2 g. of Na₂B₁₂H₁₂ (with water and glyme of crystallization, obtained by a process as described in Example II) is mixed with an aqueous solution of 12 g. of cesium fluoride. A heavy white precipitate forms which dissolves on warming the reaction mixture. On cooling, fine white crystals form which are separated by filtration and dried. There is obtained 3.2 g. cesium dodecahydrododecaborate (2−) with solvent (glyme) of crystallization.

*Example XVI*

A solution of 0.89 g. of P,P,P,P′,P′,P′-(hexamethyl) ethylenediphosphonium bromide in 5 ml. of water is added with stirring to a solution of 1.13 g. of the cesium salt of Example XIII(B) in 100 ml. of water. A voluminous white precipitate forms. The mixture is boiled to dissolve most of the precipitate. Cooling of the hot solution results in precipitation of a white solid which is separated by filtration. The solid is recrystallized from 1 liter of water to form soft white needles. The product is P,P,P,P′,P′,P′ - (hexamethyl)ethylenediphosphonium dodecahydrododecaborate, (2−), i.e., $$[(CH_3)_3PCH_2CH_2P(CH_3)_3]B_{12}H_{12}$$

The identity of the compound is confirmed by the infrared spectrum and by elemental analysis. The product, as obtained, is free of water of hydration.

*Analysis.*—Calc'd for C₈H₃₄B₁₂P₂: C, 29.83; H, 10.64; B, 40.29; P, 19.24. Found: C, 29.89; H, 10.94; B, 39.86; P, 19.31.

*Example XVII*

(A) An aqueous solution containing 0.01 mole of Na₂B₁₂H₁₂ is added with stirring to 13 ml. of an aqueous solution containing 2.2 g. of ZnCl₂ and 7 ml. of concentrated aqueous NH₄OH. A white solid product precipitates and it is separated by filtration. The solid product is dissolved in about 700 ml. of hot aqueous ammonia (4 parts of water and 1 part of concentrated NH₄OH) and the solution is chilled. The product crystallizes as glistening white plates which are separated by filtration and dried under reduced pressure (less than 0.01 mm. of mercury) at 90° C. to yield 2.2 g. of the ammonia complex of zinc dodecahydrododecaborate having the structure Zn(NH₃)₄B₁₂H₁₂, which can be called tetraamminezinc (II) dodecahydrododecaborate (2−). The infrared absorption spectrum shows absorption bands at 4.05μ and 9.45μ, characteristic for the B₁₂H₁₂ anion, and it also shows N–H absorption bands for the bound NH₃ molecules.

*Analysis.*—Calc'd for [Zn(NH₃)₄B₁₂H₁₂: Zn, 23.65; N, 20.4; B, 47.2; H, 8.78. Found: Zn, 23.60; N, 19.55; B, 45.8; H, 8.57.

(B) Using the procedure of Part A, a small quantity of disodium dodecahydrododecaborate is treated with ammoniacal nickel(II) chloride. A lavender-colored solid product precipitates and it is separated by filtration. The product is recrystallized from hot aqueous ammonia solution to form lavender crystals which are dried at 90° C. under very low pressure (less than 0.01 mm. of mercury). The product is hexaamminenickel(II) dodecahydrororecaborate (2−), i.e., a compound of the formula Ni(NH₃)₆B₁₂H₁₂. The compound, as obtained under the above conditions of drying, contains 0.5 mole of water of crystallization. The infrared absorption spectrum of the compound shows absorption bands at 4.02μ and 9.44μ, which are characteristic for the B₁₂H₁₂ anion, as well as other bands at wave lengths which are characteristic for the hexaamminenickel cation.

*Analysis.*—Calc'd for Ni(NH₃)₆B₁₂H₁₂·½H₂O: Ni, 18.61; N, 26.95; B, 41.6. Found: Ni, 18.81; N, 26.86; B, 41.6.

*Example XVIII*

An aqueous solution of 4.4 g. of p-methoxybenzenediazonium tetrafluoroborate in 50 ml. of water is filtered to remove insoluble material. The filtrate is cooled in an ice bath and an aqueous solution containing 1.0 g. of the monohydrate of disodium dodecahydrododecaborate (Na₂B₁₂H₁₂·H₂O) is added to the filtrate with stirring. A heavy white precipitate forms which is separated by filtration. The solid product is dried in air and its infrared absorption spectrum shows bands at 4.0μ and 9.4μ, characteristic for the B–H and B₁₂ skeleton structures. The spectrum also shows bands at 4.4μ (for the diazonium structure) and 6.3μ, 9.1μ and 11.9μ (for the aromatic ring structure). The product is p-methoxybenzenediazonium dodecahydrododecaborate (2−), i.e.

$$[p\text{-}CH_3O\text{—}C_6H_4\text{—}N_2]_2B_{12}H_{12}$$

The identity of the compound is confirmed by elemental analysis of a portion of the product which is dried at 25° C. and 0.02 mm. pressure for 20 hours. The dried product is shock sensitive and it detonates with a flash of light and evolution of much black ash when placed on a metal block and struck with a hammer. It also detonates in the combustion chamber employed for analysis but, despite this behavior, analytical data conform reasonably well with theoretical values.

*Analysis.*—Calc'd for C₁₄H₂₆B₁₂N₄O₂: C, 40.74; H, 6.36. Found: C, 38.86; H, 6.26.

The diazonium salt of Example XVIII reacts with potassium phenoxide in ethanol solution to form a solution of intense yellow color, characteristic of an aromatic diazonium salt.

A further characteristic reaction of the diazonium salt of Example XVIII is its rearrangement in refluxing ethanol solution to a hydrate of the acid of an arylazo-substituted polyhydrododecaborate, i.e., a compound of the formula (H₃O)₂B₁₂H₁₀(N₂C₆H₄OCH₃)₂. This compound dissolves in ethanol to form a solution of violet color. Evaporation of the solvent leaves a tacky purple solid. This product is useful as a dye for fabrics.

By using the processes illustrated in Examples XIV, XV and XVI, sodium or potassium dodecahydrododecaborate can be reacted with rubidium chloride to yield Rb₂B₁₂H₁₂; with strontium chloride to yield SrB₁₂H₁₂; with tantalum chloride to yield Ta(B₁₂H₁₂)₂; with chromium sulfate to yield Cr₂(B₁₂H₁₂)₃; with manganous acetate to yield MnB₁₂H₁₂; with cupric chloride to yield CuB₁₂H₁₂; with cuprous chloride to yield Cu₂B₁₂H₁₂; with zinc bromide to yield ZnB₁₂H₁₂; with cadmium chloride to yield CdB₁₂H₁₂; with aluminum chloride (hydrated) to yield Al₂(B₁₂H₁₂)₃; with stannic chloride (hydrated) to yield Sn(B₁₂H₁₂)₂; with bismuth chloride to yield Bi₂(B₁₂H₁₂)₃; with benzyltrimethylammonium chloride to yield [(C$_6$H$_5$CH$_2$)(CH$_3$)$_3$N]$_2$B$_{12}$H$_{12}$; with tetrabutylammonium chloride to yield

[(C$_4$H$_9$)$_4$N]$_2$B$_{12}$H$_{12}$ with tetramethylphosphonium bromide to yield

[(CH$_3$)$_4$P]$_2$B$_{12}$H$_{12}$ with methyltriphenylphosphonium bromide to yield [CH$_3$(C$_6$H$_5$)$_3$P]$_2$B$_{12}$H$_{12}$; and with dicyclohexyldihydrogenphosphonium bromide to yield [(C$_6$H$_{11}$)$_2$PH$_2$]$_2$B$_{12}$H$_{12}$. The reaction can be conducted in nonaqueous solvents, for example, methanol, ethanol, ether and the like, if desired.

By using the process of Example XVII with the appropriate metal halide there can be obtained a wide variety of metal ammine dodecahydrododecaborates, e.g., with cobalt chloride, [Co(NH$_3$)$_4$]B$_{12}$H$_{12}$ is obtained; with copper chloride, [Cu(NH$_3$)$_4$]B$_{12}$H$_{12}$ is obtained.

By using the process illustrated in Example XVIII with the appropriate aryldiazonium halide, a broad range of diazonium salts are obtained, e.g., with phenyldiazonium chloride, there is obtained (C$_6$H$_5$N$_2$)$_2$B$_{12}$H$_{12}$, with naphthyldiazonium bromide, (C$_{10}$H$_7$N$_2$)$_2$B$_{12}$H$_{12}$ is obtained; and with p-ethoxyphenyldiazonium chloride, (C$_2$H$_5$OC$_6$H$_4$N$_2$)$_2$B$_{12}$H$_{12}$ is obtained.

The dodecahydrododecaborate salts show a remarkable and unexpected stability in solution, particularly in the presence of inorganic acids. To illustrate, 1.00 g. of Na$_2$B$_{12}$H$_{12}$·H$_2$O is dissolved in 50 ml. of 5% hydrochloric acid solution. The solution is refluxed for 1 hour and it is then cooled rapidly and stored at 0–5° C. After a short period the solution is evaporated to dryness under reduced pressure. There is obtained 1.2 g. of white, crystalline residue which is shown by the infrared absorption spectrum to be Na$_2$B$_{12}$H$_{12}$ with a small quantity of H$_2$B$_{12}$H$_{12}$. The infrared absorption spectrum shows that the B$_{12}$H$_{12}$ anion is unaffected by the acid.

The free acid in the form of its hydrate, prepared as described in Example XIII, Part A, is completely stable during storage in conventional containers at ordinary atmosphere conditions. Even after 32 days standing in a closed container, the infrared absorption spectrum is unchanged, showing no evidence of hydrolysis, oxidation, rearrangement or decomposition.

The dodecahydrododecaborate salts are not hydrolyzed or decomposed by refluxing in neutral boiling water for 1 hour.

This application is a continuation-in-part of our earlier filed application Serial No. 15,042, filed March 15, 1960, and now abandoned.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. Compounds having the formula

M$_a$(B$_{12}$H$_{12}$)$_b$ wherein M is a cation having a total atomic weight of at least 5 and a valence of less than 5, and $a$ and $b$ vary from 1 to 3 and satisfy the following relation:

$$b = \frac{a \times \text{valence of M}}{2}$$

2. Compounds having the formula

M$_a$(B$_{12}$H$_{12}$)$_b$ wherein M is a metal having an atomic weight of from about 5 to 209, and $a$ and $b$ vary from 1 and 3 and satisfy the following relation:

$$b = \frac{a \times \text{valence of M}}{2}$$

3. Compounds having the formula

M$_a$(B$_{12}$H$_{12}$)$_b$ wherein M is a cation of a nitrogen base having a molecular weight of from about 17 to 800, and $a$ and $b$ vary from 1 to 3 and satisfy the following relation:

$$b = \frac{a \times \text{valence of M}}{2}$$

4. Compounds having the formula

M$_a$(B$_{12}$H$_{12}$)$_b$ wherein M is a cation of a phosphonium base, and $a$ and $b$ vary from 1 to 3 and satisfy the following relation:

$$b = \frac{a \times \text{valence of M}}{2}$$

5. Disodium dodecahydrododecaborate (2−).
6. Dipotassium dodecahydrododecaborate (2−).
7. Bis(tetramethylammonium) dodecahydrododecaborate (2−).
8. Dicesium dodecahydrododecaborate (2−).
9. The ammonium complex of zinc dodecahydrododecaborate (2−) having the structural formula Zn(NH$_3$)$_4$B$_{12}$H$_{12}$ 10. Barium dodecahydrododecaborate (2−).

References Cited in the file of this patent

UNITED STATES PATENTS 2,921,963    Baker _____ Jan. 19, 1960

OTHER REFERENCES

Hurd: Chemistry of the Hydrides, John Wiley, pp. 81, 83, August 25, 1952.
Lipscomb: J. Phys. Chem. 62, 381–2 (1958).
Lipscomb: Abstracts of Papers, 133rd ACS Meeting (San Francisco).

UNITED STATES PATENT OFFICE
CERTIFICATE OF CORRECTION

Patent No. 3,169,045                  February 9, 1965

Henry C. Miller et al.

It is hereby certified that error appears in the above numbered patent requiring correction and that the said Letters Patent should read as corrected below.

Column 16, line 15, for "from 1 and 3" read -- from 1 to 3 --.

Signed and sealed this 29th day of June 1965.

(SEAL)
Attest:

ERNEST W. SWIDER                  EDWARD J. BRENNER
Attesting Officer                  Commissioner of Patents